(12) United States Patent
Park

(10) Patent No.: US 9,035,502 B2
(45) Date of Patent: May 19, 2015

(54) MULTIFUNCTIONAL VOICE COIL MOTOR

(75) Inventor: Sangok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 441 days.

(21) Appl. No.: 13/366,865

(22) Filed: Feb. 6, 2012

(65) Prior Publication Data

US 2012/0200176 A1    Aug. 9, 2012

(30) Foreign Application Priority Data

| Feb. 7, 2011 | (KR) | ........................ | 10-2011-0010757 |
| Feb. 7, 2011 | (KR) | ........................ | 10-2011-0010758 |
| Feb. 7, 2011 | (KR) | ........................ | 10-2011-0010759 |
| Jun. 1, 2011 | (KR) | ........................ | 10-2011-0052819 |

(51) Int. Cl.
| H02K 41/03 | (2006.01) |
| H02K 41/02 | (2006.01) |
| H02K 41/035 | (2006.01) |
| G02B 7/10 | (2006.01) |
| G02B 27/64 | (2006.01) |
| G03B 3/10 | (2006.01) |

(52) U.S. Cl.
CPC ............ *H02K 41/0356* (2013.01); *G02B 7/102* (2013.01); *G02B 27/646* (2013.01); *G03B 3/10* (2013.01); *G03B 2205/0007* (2013.01); *G03B 2205/0069* (2013.01)

(58) Field of Classification Search
CPC .................................................... H02K 41/035
USPC ........... 310/12.16, 12.7, 12.21, 14, 15, 12.17; 348/374; 359/824; 381/394
See application file for complete search history.

(56) References Cited

U.S. PATENT DOCUMENTS

| 5,337,865 | A | * | 8/1994 | Kasahara et al. | ............. 188/378 |
| 2010/0093220 | A1 | * | 4/2010 | Ueda et al. | ..................... 439/626 |
| 2011/0097062 | A1 | * | 4/2011 | Tsuruta et al. | ................... 396/55 |
| 2011/0122267 | A1 | * | 5/2011 | Ahn et al. | .................. 348/208.7 |

FOREIGN PATENT DOCUMENTS

JP     10207467 A  *  8/1998

OTHER PUBLICATIONS

Machine Translation JP10207467 (1998).*

* cited by examiner

*Primary Examiner* — Jose Gonzalez Quinones
(74) *Attorney, Agent, or Firm* — Saliwanchik, Lloyd & Eisenschenk

(57) ABSTRACT

A multifunctional voice coil motor is disclosed, the motor including a rotor including a bobbin and a plurality of magnets arranged at a periphery of the bobbin, a stator including a housing wrapping each magnet and a plurality of coil blocks each arranged at a position corresponding to that of each magnet, a base coupled to the housing, and an elastic member elastically supporting the rotor.

20 Claims, 13 Drawing Sheets

MULTIFUNCTIONAL VOICE COIL MOTOR

CROSS-REFERENCE TO RELATED APPLICATIONS

This application claims the benefit under 35 U.S.C. §119 of Korean Patent Application Nos. 10-2011-0010757, 10-2011-0010758, 10-2011-0010759, each tiled on Feb. 7, 2011, and 10-2011-0052819 filed on Jun. 1, 2011, which are hereby incorporated by reference in their entirety.

BACKGROUND OF THE INVENTION

1. Field of the Invention

The present disclosure relates to a multifunctional voice coil motor, and more particularly to a multifunctional voice coil motor enabling to realize an auto-focusing function configured to adjust a gap between an image sensor and a lens, and a hand-shake correcting function as well.

2. Description of Related Art

With the recent proliferation of digital still and video cameras, there is an increasing demand for photographing high-quality still and moving pictures. Recently, mobile phones and smart phones have been developed that are mounted with a camera module capable of storing a subject as a digital still image or moving picture.

A conventional camera module includes a lens and an image sensor module configured to convert light having passed the lens to a digital image. However, the conventional camera module has suffered from a disadvantage in that it is difficult to obtain a high quality digital image due to lack of auto-focusing function capable of automatically adjusting a gap between the lens and the image sensor module.

BRIEF SUMMARY

The present invention is directed to provide a multifunctional voice coil motor that is adequate to perform both an auto-focusing function capable of adjusting a gap between an image sensor and a lens and a hand-shake correcting function.

The present invention is also directed to provide a multifunctional voice coil motor enabling to realize both an auto-focusing function configured to adjust a gap between an image sensor and a lens, and a hand-shake correcting function, and enabling to improve a self-alignment and an electrical connection between a terminal plate connected to a coil block generating a magnetic field and a circuit substrate.

Technical problems to be solved by the present disclosure are not restricted to the above-mentioned descriptions, and any other technical problems not mentioned so far will be clearly appreciated from the following description by skilled in the art.

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a multifunctional voice coil motor, comprising: a rotor including a bobbin and a plurality of magnets arranged at a periphery of the bobbin; a stator including a housing wrapping each magnet and a plurality of coil blocks each arranged at a position corresponding to that of each magnet; a base coupled to the housing; and an elastic member elastically supporting the rotor.

Preferably, the stator includes a terminal plate connected to each terminal of each coil block, and the base is formed with a receptor accommodating the terminal plate.

Preferably, the receptor is a groove concavely formed from a lateral surface of the base corresponding to each terminal plate.

Preferably, the receptor is formed in the shape of a groove through which each terminal plate passes, and formed with a guide unit guiding the terminal plate.

Preferably, the guide unit includes a guide hole through which the terminal plate passes.

Preferably, the guide unit includes a guide rib guiding each lateral surface of the terminal plate.

Preferably, a distal end of the terminal plate is protruded from a rear surface of the base.

Preferably, the distal end of the terminal plate protruded from the rear surface of the base is bent in parallel with the rear surface of the base.

Preferably, the multifunctional voice coil motor further comprises a circuit substrate arranged at the rear surface of the base, and the circuit substrate is formed with a connection terminal electrically connected to the distal end of the terminal plate protruded from the rear surface of the base.

Preferably, the distal end of the terminal plate and the connection terminal is mutually electrically connected by any one of solder and conductive adhesive.

Preferably, the connection terminal is formed with an insertion hole into which the distal end of the terminal plate is inserted.

Preferably, the base is protruded at an upper corner thereof with a coupling pillar, and the housing is formed with a coupling groove coupled with the coupling Preferably, the housing is arranged with terminal plates corresponding to both distal ends of each coil block, and the terminal plates and the distal ends of each coil block are respectively electrically connected via a connection member.

Preferably, the connection member includes a solder electrically connecting the terminal plate and the distal end of the coil block.

Preferably, the connection member includes a conductive adhesive electrically connecting the terminal plate and the distal end of the coil block.

Preferably, a position corresponding to each coil block on the lateral wall of the housing is formed with a coil block receptor groove preventing the coil block from protruding from the lateral wall of the housing.

Preferably, the terminal plate is inserted into the housing, and a part contacting the coil block on the terminal plate is exposed by the coil block receptor groove.

Preferably, a part contacting the coil block on the terminal plate is formed with a plating layer.

Preferably, the lateral wall of the housing is connected to the coil block receptor groove and is formed with a terminal plate receptor groove accommodating the terminal plate.

Preferably, the distal end of the coil block is interposed between a floor surface formed by the receptor groove and a rear surface of the terminal plate opposite to the floor surface.

Preferably, the terminal plate arranged at the terminal plate receptor groove is attached to the lateral wall of the housing via an adhesive.

Preferably, the multifunctional voice coil motor further comprises a circuit substrate coupled to an image sensor module arranged at a rear surface of the base, and the terminal plate is extended from the housing, passes the base and is electrically connected a terminal unit of the circuit substrate.

Preferably, an adhesive member is interposed between the bobbin and the magnet.

Preferably, a periphery of the bobbin opposite to the magnet is formed with at least one receptor groove accommodating the adhesive member.

Preferably, a rear surface of the magnet opposite to the periphery of the bobbin is formed with at least one tug protruded to the receptor groove.

Preferably, the rear surface of the magnet opposite to the periphery of the bobbin is formed with at least one hitching member that is inserted into the receptor groove.

Preferably, the rear surface of the magnet opposite to the periphery of the bobbin is formed with at least one receptor groove accommodating the adhesive member.

Preferably, the periphery of the bobbin is formed with at least one lug protruded to the receptor groove formed at the rear surface of the magnet.

Preferably, the adhesive member includes an adhesive.

Preferably, the elastic member includes a first frame unit coupled to the distal end of the bobbin to elastically support the rotor, a second frame unit coupled to a distal end of the housing and an elastic unit connected to a central unit of the first frame unit and connected to a central unit of the second frame unit.

Preferably, the first frame unit takes a shape of circular ring and the second frame unit takes a shape of a square ring.

Preferably, the elastic unit is formed in parallel with two sides adjacent to the second frame unit.

Preferably, the elastic unit takes an "L" shape when viewed from a plane.

Preferably, two elastic units are symmetrically formed based on a center of the first frame unit.

Preferably, the elastic unit includes a first elastic unit connected to the first frame unit and a second elastic unit connected to the second frame unit.

Preferably, each of the first and second elastic units takes a shape of a straight line.

Preferably, each of the first and second elastic units is formed with a third elastic unit.

Preferably, a portion of the third elastic unit takes a shape of a straight line.

Preferably, the third elastic unit takes an "S" shape when viewed from a plane.

Preferably, the elastic unit includes a first elastic unit connected to the first frame unit in the shape of an "S", and a second elastic unit connected to the second frame unit in the shape of an "S", wherein the first and second elastic units are mutually connected.

Preferably, an air gap is formed between an outer lateral surface of the rotor and an inner lateral surface of the stator for providing a space for the rotor to tilt inside the stator.

Preferably, the air gap is in the range of 0.05 mm to 0.25 mm.

The multifunctional voice coil motor according to the present disclosure has an advantageous effect in that a handshake correction mode and an auto-focusing mode are simultaneously performed, and a magnet is prevented from deviating from a bobbin.

BRIEF DESCRIPTION OF THE DRAWINGS

The teachings of the present disclosure can be readily understood by considering the following detailed description in conjunction with the accompanying drawings, in which.

DETAILED DESCRIPTION

Figure 1:
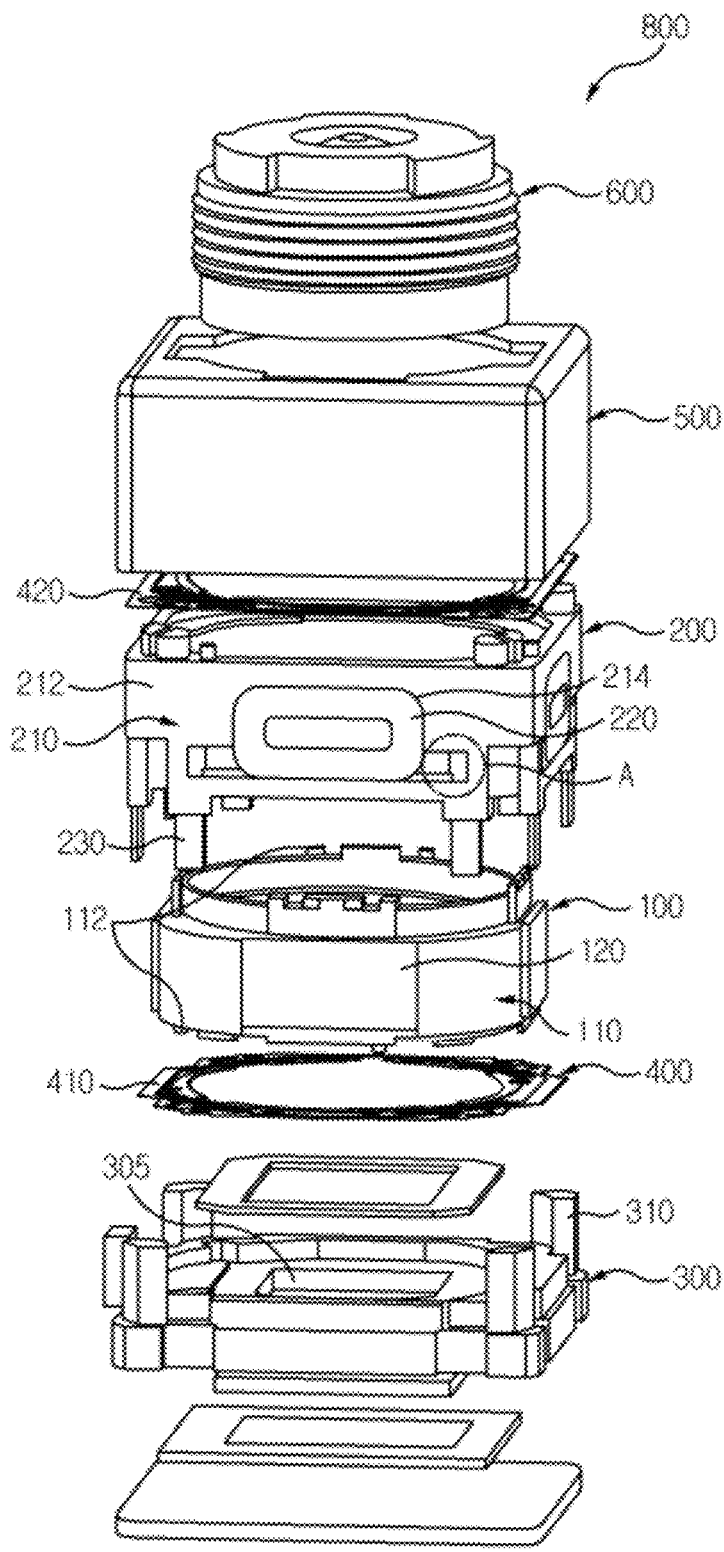
FIG. 1 is an exploded perspective view illustrating a multifunctional voice coil motor according to an exemplary embodiment of the present disclosure.

The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

In the drawings, the size and relative sizes of layers and regions may be exaggerated for clarity. Like numbers refer to like elements throughout, and explanations that duplicate one another will be omitted.

Now, exemplary embodiments of a multifunctional voice coil motor according to the present disclosure will be explained in detail together with the figures.

Figure 2:
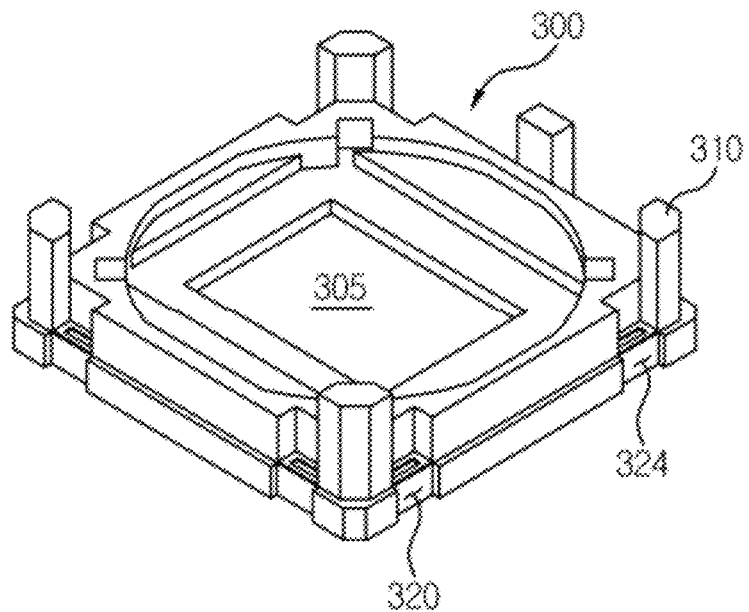
FIG. 2 is a perspective view of a base illustrated in FIG. 1.
Figure 3:
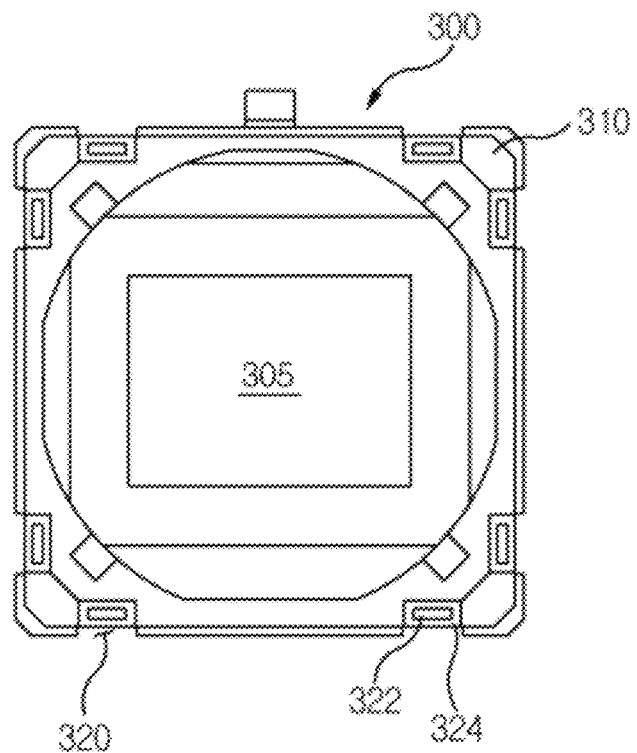
FIG. 3 is a plan view of a base illustrated in FIG. 1.

FIG. 1 is an exploded perspective view illustrating a multifunctional voice coil motor according to an exemplary embodiment of the present disclosure, FIG. 2 is a perspective view of a base illustrated in FIG. 1, and FIG. 3 is a plan view of a base illustrated in FIG. 1.

Referring to FIGS. 1, 2 and 3, a multifunctional voice coil motor (hereinafter referred to VCM, 800) performing auto-focusing and hand-shake correction functions includes a rotor (100), a stator (200), a base (300) and an elastic member (400). In addition, the multifunctional VCM (800) may further include a cover can (500) and a lens barrel (600).

The rotor (100) includes a bobbin (110) and a magnet (300). The rotor (100), in association with the stator (200), moves up and down relative to the base (300) to perform an auto-focusing function and tilts at an upper surface of the base (300) to perform a hand-shake correcting function as well.

In a non-limiting example, the bobbin (110) may take a cylindrical shape and be formed at an inner surface with a female thread for coupling with the lens barrel (600). An upper surface of the bobbin (110) and a lower surface opposite to the upper surface of the bobbin (110) are respectively formed with coupling lug (112) for coupling with the elastic member (400, described later).

The periphery of the bobbin (110) is alternatively formed with a curved section and a straight section. The periphery of the bobbin (110) may be alternatively formed with four straight sections and four curved sections, for example. The four straight sections formed on the periphery of the bobbin (110) are formed with a groove concavely formed from the periphery of the bobbin (110).

The magnet (120) is coupled to the straight sections formed at the periphery of the bobbin (110). In a non-limiting example, the magnet (120) may be arranged on mutually opposite two straight sections in the four straight sections formed at the periphery of the bobbin (11) or four straight sections, each facing the other. The magnet (120) may include a two pole flat magnet or a four pole flat magnet.

Referring again to FIG. 1, the stator (200) includes a housing (210), a coil block (220) and a terminal plate (230). The housing (210) may take a cylindrical shape opened at an upper and bottom surfaces, for example. The housing (210) is arranged therein with the rotor (100) and wraps the magnet (120) arranged at the periphery of the bobbin (110) at the rotor (100).

In the exemplary embodiment of the present disclosure, the housing (210) takes a square cylindrical shape formed with four lateral walls (212), for example. The housing (210) may be formed by injection molding using synthetic resin.

The coil block (220) is formed by winding a long wire coated with insulation resin such as enamel resin. In the exemplary embodiment of the present disclosure, the coil block (220) is wound with the wire in a rectangular shape to allow a square opening to be formed therein. One distal end of the wire forming the coil block (220) and the other distal end opposite to the distal end are formed in mutually opposite direction relative to the coil block (220).

In a non-limiting example, the distal end of the wire forming the coil block (220) is arranged at the left side of the coil block (220), and the other distal end opposite to the distal end of the wire is arranged at the right side of the coil block (220).

The coil block (220) is formed with a predetermined thickness to be wound with the wire. In a case the coil block (220) having with the predetermined thickness is arranged on the lateral surface (212) of the housing (210), the coil block (220) may be protruded from the lateral surface (212) to increase the thickness of the multifunctional VCM (800).

In the exemplary embodiment of the present disclosure, in order to prevent the multifunctional VCM (800) from having an increased volume caused by the coil block (220), a receptor groove (214) is formed at an area opposite to the magnet (120) of the rotor (100) on an outer lateral surface of the lateral wall (212) of the housing (210).

The rotor (100) moves up and down to perform the auto-focusing function by applying a driving current to at least two mutually opposite coil blocks (220) among the coil blocks (22).

Meanwhile, the rotor (100) tilts relative to the base (300) to perform the hand-shake correcting function by applying a driving current to at least two not oppositely but adjacently formed two blocks (220) among the coil blocks (220) coupled to the housing (210). The receptor groove (214) formed at an outer lateral wall of the lateral wall (212) of the housing (210) is formed in a shape corresponding to that of the coil block (220). Thus, depth of the receptor groove (214) is formed deeper than the thickness of the coil block (220) in order to prevent the coil block (220) of the housing (210) from protruding from the outer lateral wall of the lateral wall (212) at the housing (210).

Although the exemplary embodiment of the present disclosure has illustrated and explained the formation of the groove-shaped receptor groove (214) at the outer lateral wall of the lateral wall (212) of the housing (210), a through hole having the same shape as that of the coil block (220) may be formed at the housing (210) corresponding to the magnet (120).

Meanwhile, a driving signal is structurally difficult to be applied to the coil block (220), in a case the housing (210) is arranged with coil blocks (220) each corresponding to each magnet (120). Particularly, the driving signal is difficult to be applied to the coil block (220) from a circuit substrate (311) formed at a rear surface of the base (300, described later).

The terminal plate (230) serves to transmit a driving signal provided from the circuit substrate (311) arranged at the rear surface of the base (300) to the coil block (220). The terminal plate (230) is protruded from a bottom surface of the housing (210) at a predetermined length to allow being electrically connected to the circuit substrate (311) arranged at the rear surface of the base (300) by passing the base (300, described later), as shown in FIG. 1.

At this time, the terminal plate (230) protruded from the bottom surface of the base (300) may be arranged to a direction parallel with the lateral wall (212) of the housing (210). Alternatively, the terminal plate (230) protruded from the bottom surface of the base (300) may be bent to a direction parallel with the bottom surface of the base (300).

Now, referring to FIGS. 2 and 3, the base (300) takes a shape of a parallelepiped, for example. The base (300) is centrally formed with an opening (305), and a coupling pillar (310) is protruded from the base (300) for coupling with the housing (200). The coupling pillar (310) of the base (300) and the coupling groove (216) formed at the housing (200) opposite to the coupling pillar (310) are coupled by way of press-fitting method. The base (300) may be mounted at a rear surface with an IR (Infrared) filter and an image sensor module.

The base (300) is formed with a receptor unit (320) accommodating the terminal plate (230) protruded from the bottom surface of the housing (210), and the terminal plate (230)

protruded from the bottom surface of the housing (210) passes the receptor unit (320). The receptor unit (320) formed at the base (300) prevents the terminal plate (230) connected to the coil block (220) from connecting to other devices than the circuit substrate (311). The receptor unit (320) may be a groove concavely formed from the lateral surface of the base corresponding to each terminal plate (230), for example.

Width of the receptor unit (320) is wider than that of the terminal plate (230) to allow each terminal plate (230) to be easily inserted into the receptor unit (320). Meanwhile, in a case width of the receptor unit (320) is formed wider than that of the terminal plate (230), the terminal plate (230) passing the receptor unit (320) may not be exactly arranged at a connection terminal (312) of the circuit substrate (311) arranged at the bottom surface of the base (300).

In the exemplary embodiment of the present disclosure, a guide unit (324) formed with a guide hole (322) is formed inside the receptor unit (320) to prevent a connection imperfection between the terminal plate (230) and the connection terminal (312). The guide unit (324) takes a shape of a thin plate formed with a guide hole (322). The terminal plate (230) passing the receptor unit (320) passes the guide hole (322) of the guide unit (324) to be precisely connected to the connection terminal (312) of the circuit substrate (311) formed at the bottom surface of the base (300). The terminal plate (230) arranged at the connection terminal (312) and the terminal plate (230) arranged at the connection terminal (312) are mutually coupled by solder or a conductive adhesive.

In the exemplary embodiment of the present disclosure, in a case a distal end of the terminal plate (230) is not bent, the distal end of the terminal plate (230) is inserted into an insertion hole formed at the connection terminal (312), and the terminal plate (230) arranged inside the insertion hole and the connection terminal (312) are mutually coupled by way of solder or a conductive adhesive.

Meanwhile, in a case a distal end of the terminal plate (230) is bent toward the bottom surface of the base (300), the bent unit of the terminal plate (230) may be connected on the connection terminal (312) by way of surface mounting technology method.

Referring to FIG. 1 again, the elastic member (400) includes a first elastic member (410) and a second elastic member (420). The first elastic member (410) is coupled to a lug protruded from the bottom surface of the bobbin (110) of the rotor (100), and is secured between the base (300) and the housing (200). In the exemplary embodiment of the present disclosure, the first elastic member (410) may include a leaf spring, for example. The second elastic member (420) is coupled to a lug protruded from the upper surface of the bobbin (110) of the rotor (100). The second elastic member (420) may include a leaf spring, for example.

The cover can (500) takes a shape of a square cylinder. A bottom surface of cover can (500) is completely opened, and an upper surface of cover can (500) is formed with an opening exposing the bobbin (110) of the rotor (100). The cover can (500) interrupts introduction of harmful electronic wave generated from the coil block (220) or interrupt harmful electronic wave generated from outside of the cover can (500) to the rotor (100). The cover can (500) may be formed by press work of a metal plate, for example.

The lens barrel (600) includes a male screw coupled to the female thread formed at an inner surface of the bobbin (110) of rotor (100).

Figure 4:
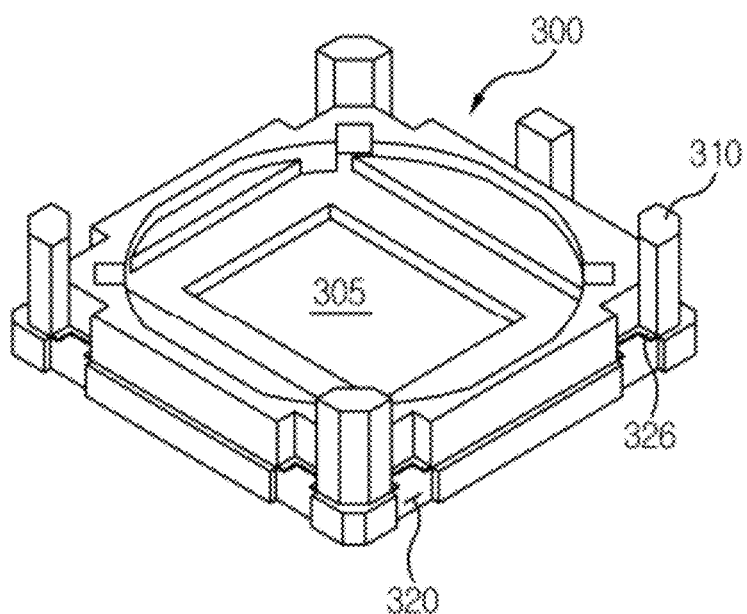
FIG. 4 is a partially expanded perspective view illustrating a base of a multifunctional voice coil motor according to another exemplary embodiment of the present disclosure.

FIG. 4 is a partially expanded perspective view illustrating a base of a multifunctional voice coil motor according to another exemplary embodiment of the present disclosure. The multifunctional voice coil motor of FIG. 4 is substantially same as that of FIGS. 1, 2 and 3 in terms of configuration. Thus, like numbers refer to like elements throughout, and explanations that duplicate one another will be omitted.

Referring to FIGS. 1, 2, 3 and 4, the multifunctional voice coil motor (800) according to another exemplary embodiment of the present disclosure includes a rotor (100), a stator (200), a base (300) and an elastic member (400). In addition, the multifunctional voice coil motor (800) may further include a cover can (500) and a lens barrel (600).

The base (300) is formed with a receptor groove (320) through which a terminal plate (230) passes, and a rib-shaped guide rib (326) is formed from inner lateral surfaces formed by the receptor groove (320). The guide rib (326) serves to guide the terminal plate (230) of the base (300) provided into the receptor groove (320) to a connection terminal (310) of a circuit substrate (312) arranged at a rear surface of the base (300), whereby connection imperfection between the terminal plate (230) and the connection terminal (312) can be prevented.

Figure 5:
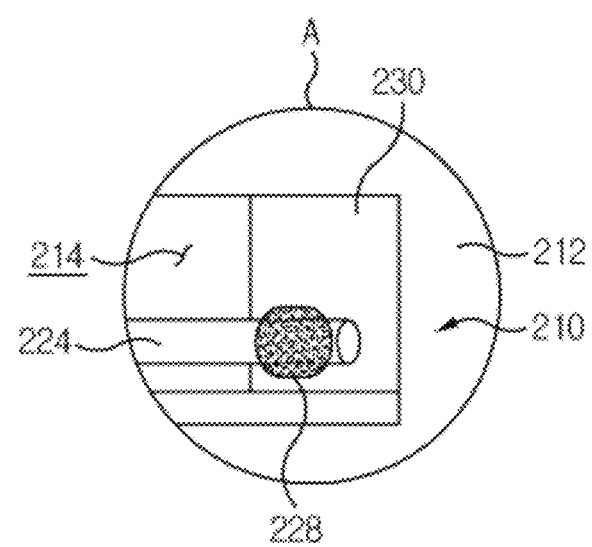
FIG. 5 is a partially expanded perspective view of "A" part of FIG. 1.
Figure 6:
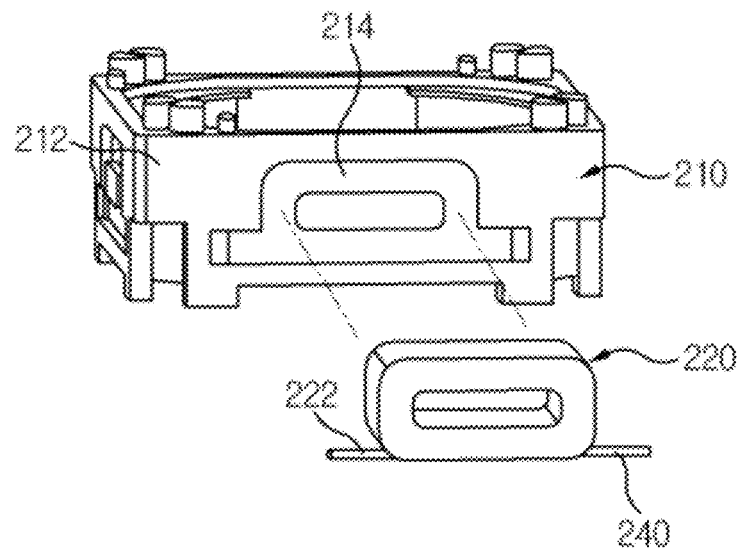
FIG. 6 is a perspective view of the housing of FIG. 1.
Figure 7:
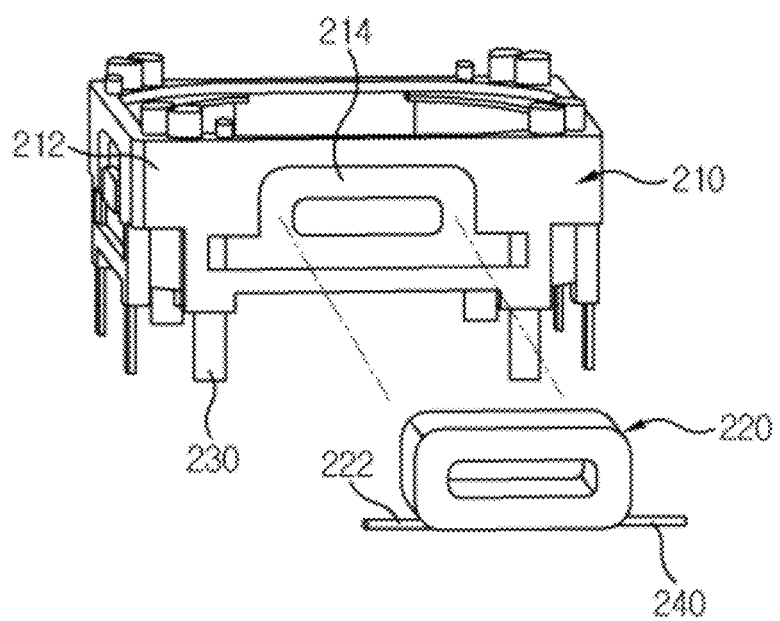
FIG. 7 is an exploded perspective view of housing, coil block and terminal plate of FIG. 1.

FIG. 5 is a partially expanded perspective view of "A" part of FIG. 1, FIG. 6 is a perspective view of the housing of FIG. 1, and FIG. 7 is an exploded perspective view of housing, coil block and terminal plate of FIG. 1.

The multifunctional voice coil motor of FIGS. 5, 6 and 7 is substantially same as that of FIGS. 1, 2, 3 and 4 in terms of configuration except for a stator. Thus, like numbers refer to like elements throughout, and explanations that duplicate one another will be omitted.

Referring to FIGS. 5, 6 and 7, the multifunctional voice coil motor (800) according to another exemplary embodiment of the present disclosure includes a rotor (100), a stator (200), a base (300) and an elastic member (400). In addition, the multifunctional voice coil motor (800) may further include a cover can (500) and a lens barrel (600).

Referring to FIG. 5, the terminal plate (230) exposed by the receptor groove (214) of the stator (200) is contacted by a distal end (222) and the other distal end (224) of the coil block (220) respectively, and the terminal plate (230) and the distal end (222) and the other distal end (224) of the coil block (220) are electrically connected. The terminal plate (230) and the distal end (222) of the coil block (220), and the terminal plate (230) and the other distal end (224) of the coil block (220) may be mutually electrically connected by a connection member (228) respectively.

In a non-limiting example, the connection member (228) may include a solder of low melting metal electrically connecting the distal end (222) of coil block (220) and the terminal plate (230), and the other distal end of coil block (220) and the terminal plate (230). At this time, in a case a wire forming the coil block (220) is a copper, a connection characteristic between the terminal plate (230) and the coil block (220) is inferior, such that a section where the distal end (222) of the coil block (220) and the other distal end (224) in the terminal plate (230) is preferably formed with a plating layer as mentioned in the foregoing. Meanwhile, the connection member (228) may include a conductive adhesive having an adhesive strength and conductivity.

Figure 8:
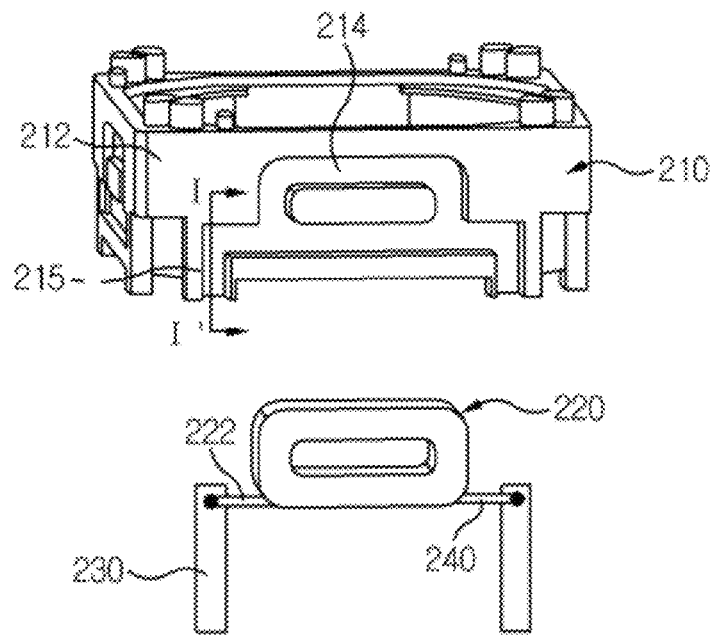
FIG. 8 is an exploded perspective view of housing, coil block and terminal plate of multifunctional voice coil motor according to another exemplary embodiment of the present disclosure.
Figure 9:
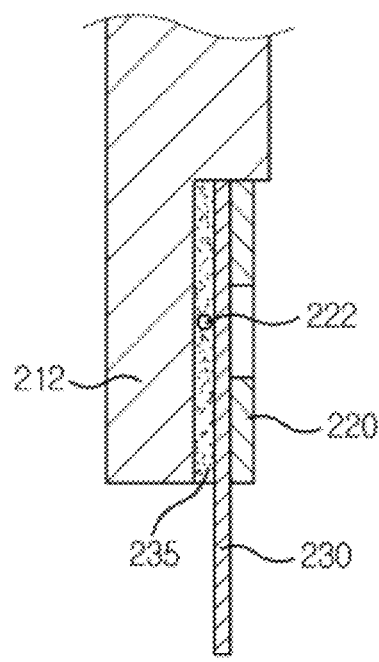
FIG. 9 is a cross-sectional view cut out along line "I-I'" of FIG. 8.

FIG. 8 is an exploded perspective view of housing, coil block and terminal plate of multifunction voice coil motor according to another exemplary embodiment of the present disclosure, and FIG. 9 is a cross-sectional view cut out along line "II' of FIG. 8.

The multifunctional voice coil motor according to another exemplary embodiment of the present disclosure is substantially same as that of FIGS. 5, 6 and 7 in terms of configuration. except for a housing, coil block and terminal plate. Thus, like numbers refer to like elements throughout, and explanations that duplicate one another will be omitted.

Referring to FIGS. 8 and 9, a lateral wall (210) of the housing (200) is formed with a coil block receptor groove (214) for accommodating the coil block (220), and the coil block receptor groove (214) is connected to a terminal plate receptor groove (215) for accommodating the terminal plate (230). Meanwhile, the distal end (222) of the coil block (220) and the other distal end (224) are respectively connected by the terminal plate (230).

The distal end (222) of the coil block (220) and the terminal plate (230) connected to the other distal end (224) are mutually connected by a solder or a conductive adhesive. The mutually connected coil block (220) and the terminal plate (230) are inserted into the coil block receptor groove (214) and the terminal plate receptor groove (215) to face a floor plate formed by the terminal plate receptor groove (215), where the terminal plate (230) is adhered by an adhesive (235).

In the exemplary embodiment of the present disclosure, assembly characteristic can be improved while assembly imperfection can be reduced by pre-connecting the coil block (220) to the terminal plate (230) and respectively accommodating the terminal plate (230) and the terminal plate receptor groove (215) to the coil block receptor groove (214) and the terry plate receptor groove (215).

Figure 10:
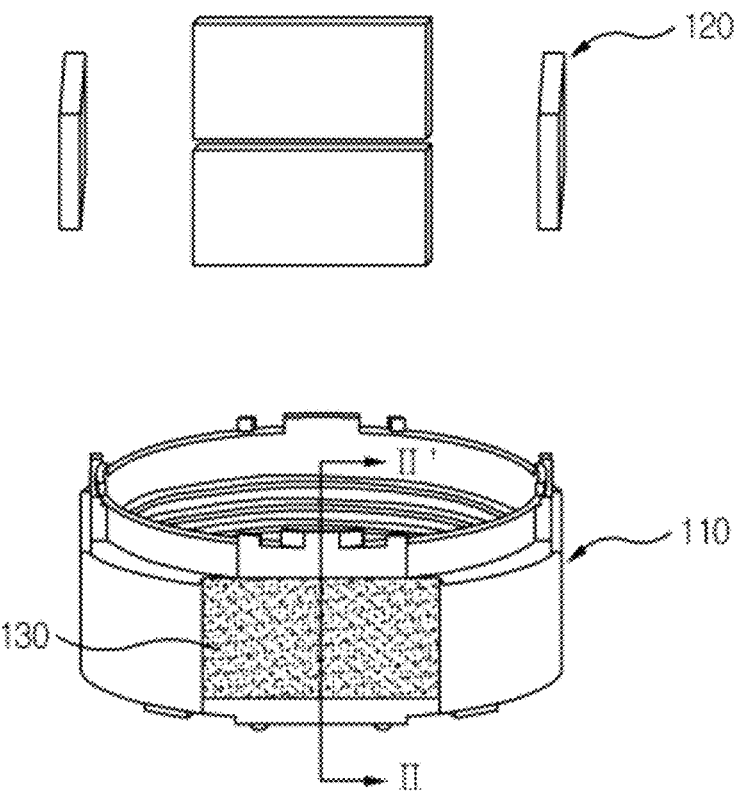
FIG. 10 is an exploded extracted perspective view of bobbin of rotor in FIG. 1 and magnet.
Figure 11:
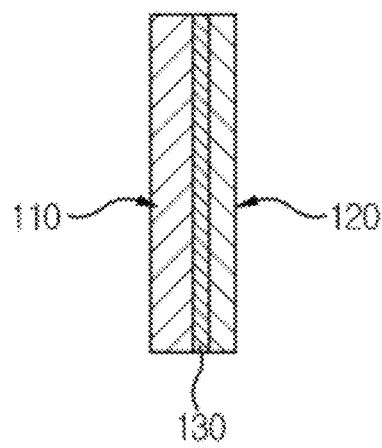
FIG. 11 is a cross-sectional view cut out along line "II-II'" of FIG. 110.

FIG. 10 is an exploded extracted perspective view of bobbin of rotor in FIG. 1 and magnet, and FIG. 11 is a cross-sectional view cut out along line "II-II' of FIG. 10.

The multifunctional voice coil motor according to another exemplary embodiment of the present disclosure is substantially same as that of FIG. 1 in terms of configuration except for the bobbin and the adhesive member that binds the magnet. Thus, like numbers refer to like elements throughout, and explanations that duplicate one another will be omitted.

Referring to FIGS. 1, 10 and 11, the rotor (100) repetitively performs the auto-focusing and/or hand-shake correcting functions. In order to prevent the magnet (120) from deviating from the periphery of the bobbin (110), an adhesive member (130) may be arranged between an outer lateral surface of bobbin (110) at the rotor (100) and a rear surface of the magnet (120) opposite to the outer lateral surface of the bobbin (110).

In the exemplary embodiment of the present disclosure, the adhesive member (130) may be arranged at least either on the outer lateral surface of the bobbin (110) or on the rear surface of the magnet (120).

In the exemplary embodiment of the present disclosure, the magnet (20) can be prevented from deviating from the periphery of the bobbin (110), even if the rotor (100) repetitively performs the auto-focusing and/or hand-shake correcting functions using the adhesive member (130) arranged at least either on the outer lateral surface of the bobbin (110) or on the rear surface of the magnet (120).

Figure 12:
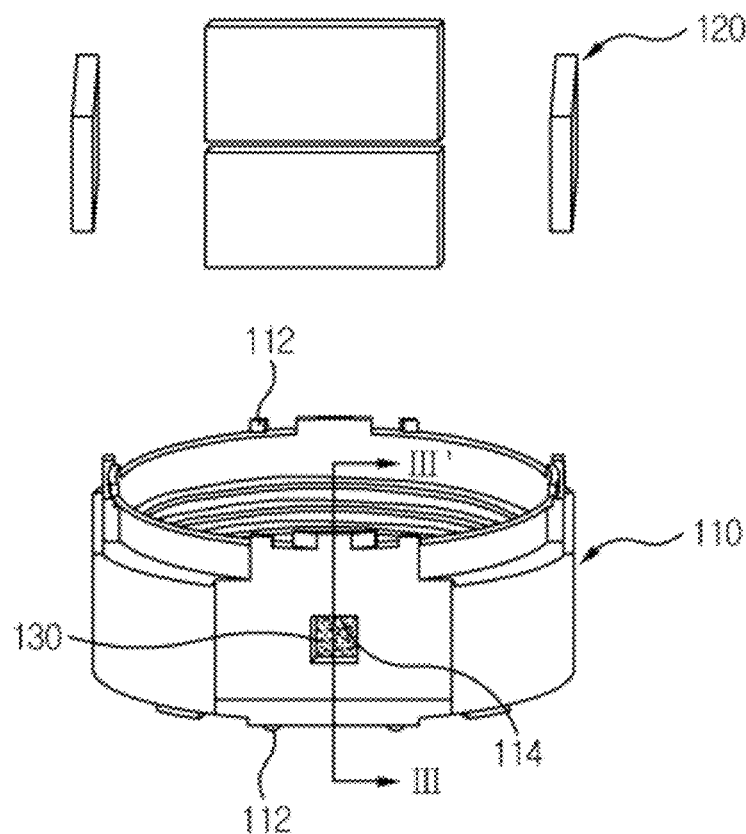
FIG. 12 is an exploded perspective view illustrating a multifunctional voice coil motor according to still another exemplary embodiment of the present disclosure.
Figure 13:
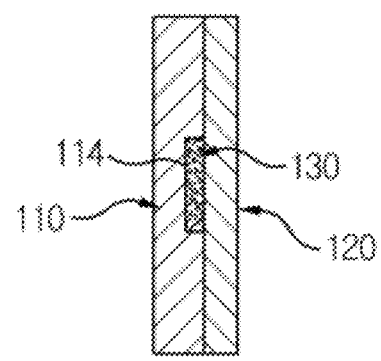
FIG. 13 is a cross-sectional view cut out along line "III-III'" after magnet of FIG. 12 and bobbin are coupled.

FIG. 12 is an exploded perspective view illustrating a multifunctional voice cod motor according to still another exemplary embodiment of the present disclosure, and FIG. 13 is a cross-sectional view cut out along line "III-III' after magnet of FIG. 12 and bobbin are coupled.

The multifunctional voice coil motor according to still another exemplary embodiment of the present disclosure is substantially same as that of FIGS. 10 and 11 in terms of configuration. except for the bobbin of the rotor. Thus, like numbers refer to like elements throughout, and explanations that duplicate one another will be omitted.

Referring to FIGS. 1, 12 and 13, the multifunctional voice coil motor (800) performing the auto-focusing and hand-shake correcting functions according to another exemplary embodiment of the present disclosure includes a rotor (100), a stator (200), a base (300) and an elastic member (400). In addition, the multifunctional voice coil motor (800) may further include a cover can (500) and a lens barrel (600).

A magnet (120)-mounted straight section among the curved section and straight section formed at the housing (210) of the rotor (100) is formed with a receptor groove (114), which in turn stores an adhesive member (130), which in turn serves to mutually bind the magnet (120) and the housing (110).

In the exemplary embodiment of the present disclosure, the adhesive member (130) is stored inside the receptor groove (114), and may be formed on an entire area of a rear surface of the magnet (120). Although the exemplary embodiment of the present disclosure has illustrated and explained only one receptor groove (114) that is formed on the straight section of the housing (210), it should be apparent that at least two receptor grooves (114) may be formed on the straight section of the bobbin (110).

Figure 14:
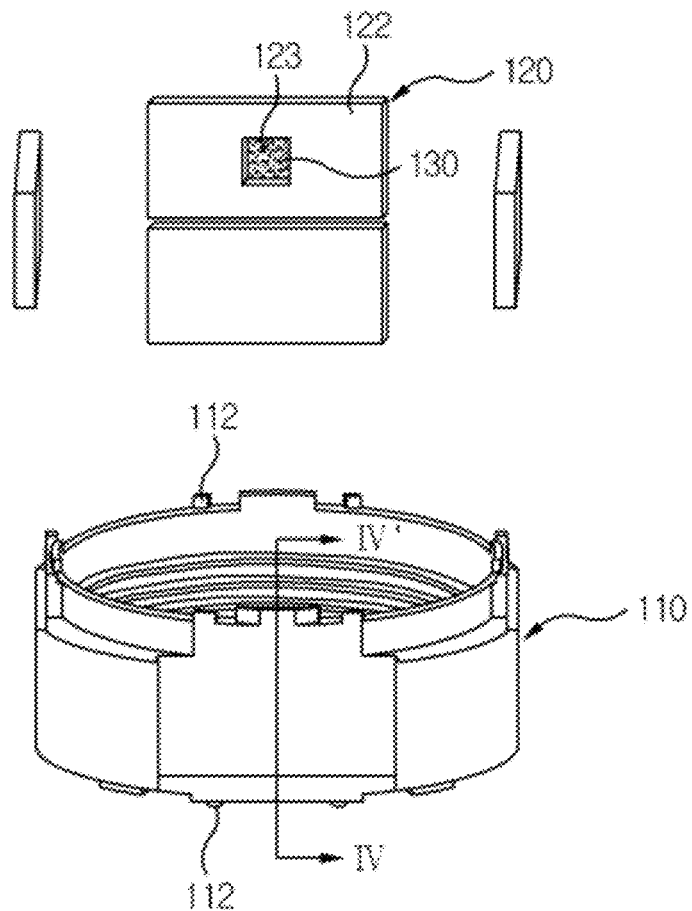
FIG. 14 is an exploded perspective view illustrating a multifunctional voice coil motor according to still another exemplary embodiment of the present disclosure.
Figure 15:
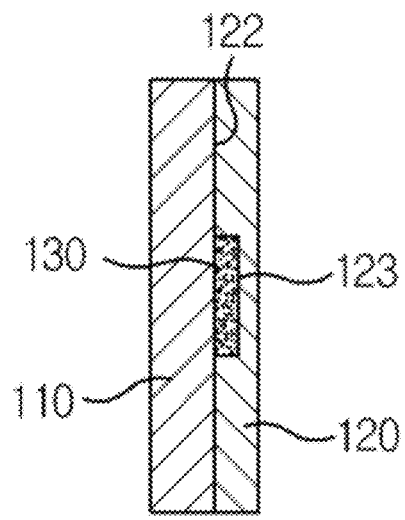
FIG. 15 is a cross-sectional view cut out along line "IV-IV'" after magnet of FIG. 14 and bobbin are coupled.

FIG. 14 is an exploded perspective view illustrating a multifunctional voice coil motor according to still another exemplary embodiment of the present disclosure, and FIG. 15 is a cross-sectional view cut out along line "IV-IV' after magnet of FIG. 14 and bobbin are coupled.

The multifunctional voice coil motor according to still another exemplary embodiment of the present disclosure is substantially same as that of FIGS. 10 and 11 in terms of configuration except for the bobbin of the rotor. Thus, like numbers refer to like elements throughout, and explanations that duplicate one another will be omitted.

Referring to FIGS. 1, 14 and 15, the multifunctional voice coil motor (800) performing the auto-focusing and hand-shake correcting functions according to another exemplary embodiment of the present disclosure includes a rotor (100), a stator (200), a base (300) and an elastic member (400). In addition, the multifunctional voice coil motor (800) may further include a cover can (500) and a lens barrel (600).

A receptor groove (123) is formed at a rear surface (122) of the magnet (120) opposite to the straight section of the bobbin (110) at the rotor (100), the receptor groove (123) stores the adhesive member (130), which in turn serves to hold the magnet (120) and the housing (210) together.

In the exemplary embodiment of the present disclosure, the adhesive member (130) is stored inside the receptor groove (123), and may be formed on an entire area of a rear surface (122) of the magnet (120). Although the exemplary embodiment of the present disclosure has illustrated and explained only one receptor groove (123) that is formed on the magnet (120), it should be apparent that at least two receptor grooves (123) may be formed on the rear surface of the magnet (120).

Figure 16:
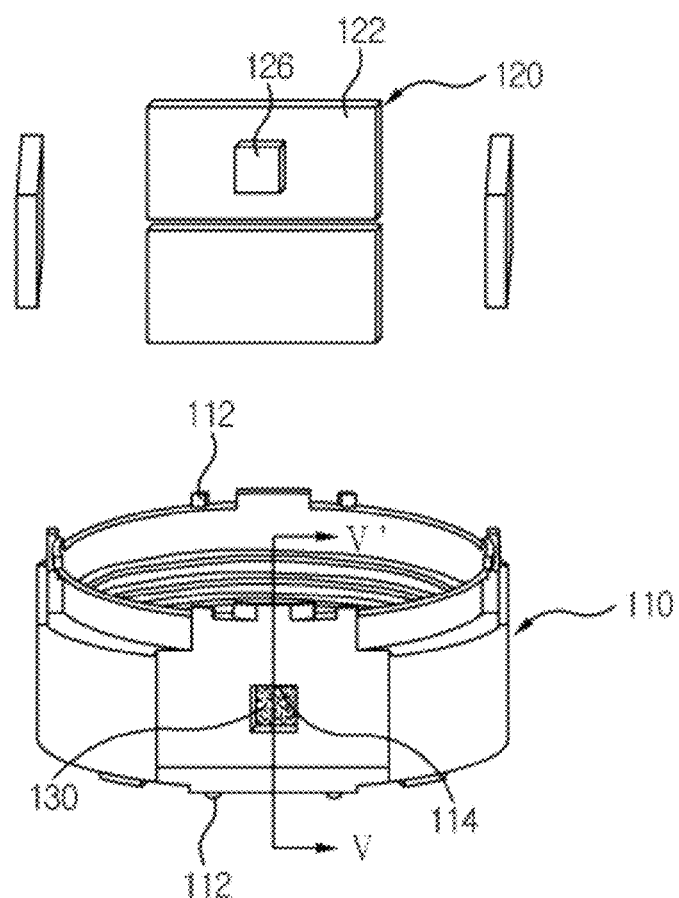
FIG. 16 is an exploded perspective view illustrating a multifunctional voice coil motor according to still another exemplary embodiment of the present disclosure.
Figure 17:
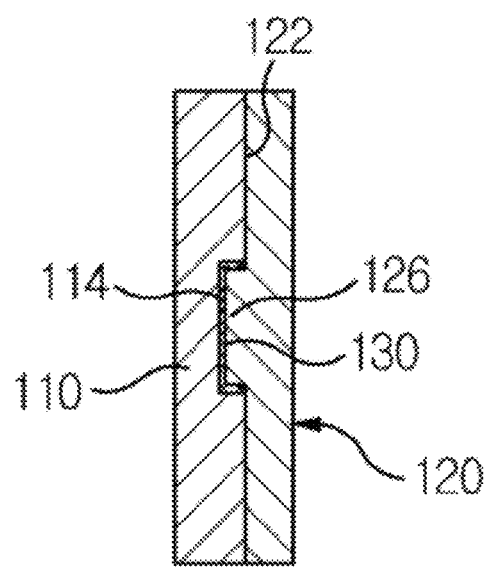
FIG. 17 is a cross-sectional view cut out along line "V-V'" after magnet of FIG. 16 and bobbin are coupled.

FIG. 16 is an exploded perspective view illustrating a multifunctional voice coil motor according to still another exemplary embodiment of the present disclosure, and FIG. 17 is a cross-sectional view cut out along line "V-V' after magnet of FIG. 16 and bobbin are coupled.

The multifunctional voice coil motor according to still another exemplary embodiment of the present disclosure is substantially same as that of FIGS. 10 and 11 in terms of configuration except for the bobbin of the rotor and the magnet. Thus, like numbers refer to like elements throughout, and explanations that duplicate one another will be omitted, Referring to FIGS. 1, 16 and 17, the multifunctional voice coil motor (800) performing the auto-focusing and hand-shake correcting functions according to another exemplary embodiment of the present disclosure includes a rotor (100), a stator (200), a base (300) and an elastic member (400). In addition, the multifunctional voice coil motor (800) may further include a cover can (500) and a lens barrel (600).

A magnet (120)-mounted straight section among the curved section and straight section formed at the housing (210) of the rotor (100) is formed with a receptor groove (114), which in turn stores an adhesive member (130), which in turn serves to mutually bind the magnet (120) and the housing (110).

In the exemplary embodiment of the present disclosure, the adhesive member (130) is stored inside the receptor groove (114), and may be formed on an entire area of a rear surface of the magnet (120). Although the exemplary embodiment of the present disclosure has illustrated and explained only one receptor groove (114) that is formed on the straight section of the housing (110), it should be apparent that at least two receptor grooves (114) may be formed on the straight section of the bobbin (110).

Meanwhile, a coupling lug (126) is formed at a rear surface (122) of the magnet (120) opposite to the straight section of the bobbin (110) formed with the receptor groove (114), the coupling lug (126) is formed at a position corresponding to that of bobbin (110), where the coupling lug (126) formed at the rear surface (122) of the magnet (120) and the receptor groove (114) formed at the straight section of the bobbin (110) are concavely and convexly (doubly-hinged, 凹凸) coupled, whereby the magnet (120) can be prevented from deviating from the bobbin (110).

Figure 18:
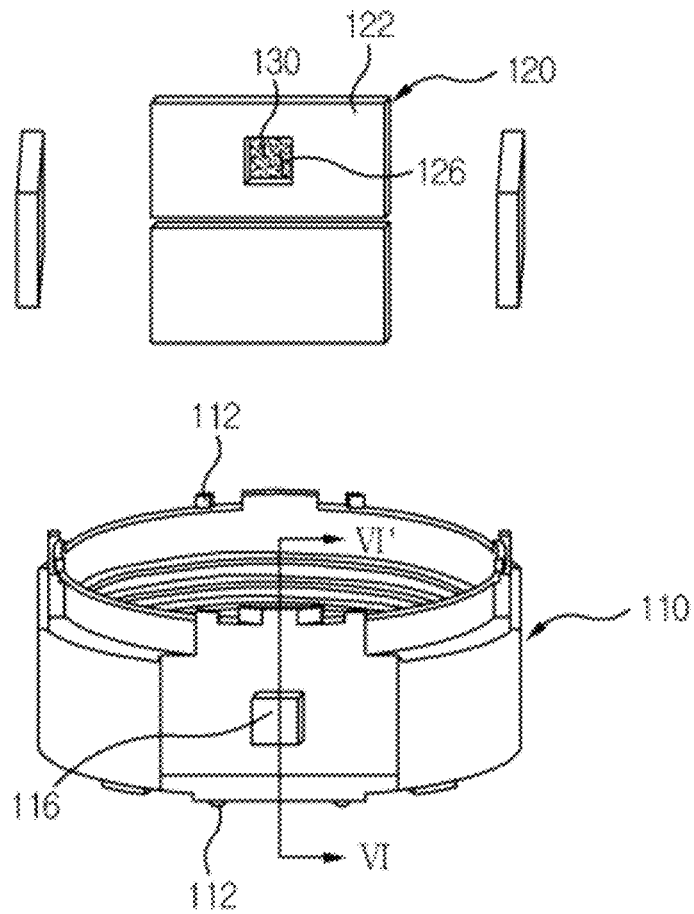
FIG. 18 is an exploded perspective view illustrating a multifunctional voice coil motor according to still another exemplary embodiment of the present disclosure.
Figure 19:
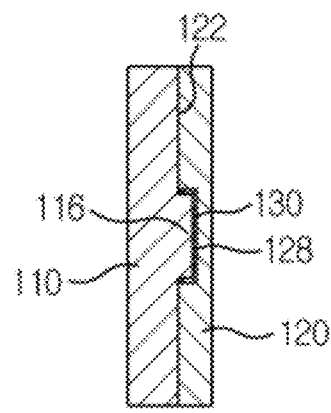
FIG. 19 is a cross-sectional view cut out along line "VI-VI'" after magnet of FIG. 18 and bobbin are coupled.

FIG. 18 is an exploded perspective view illustrating a multifunctional voice coil motor according to still another exemplary embodiment of the present disclosure, and FIG. 19 is a cross-sectional view cut out along line "VI-VI' after magnet of FIG. 18 and bobbin are coupled.

The multifunctional voice coil motor according to still another exemplary embodiment of the present disclosure is substantially same as that of FIGS. 10 and 11 in terms of configuration except for the bobbin of the rotor. Thus, like numbers refer to like elements throughout, and explanations that duplicate one another will be omitted.

Referring to FIGS. 1, 18 and 19, the multifunctional voice coil motor (800) performing the auto-focusing and hand-shake correcting functions according to another exemplary embodiment of the present disclosure includes a rotor (100), a stator (200), a base (300) and an elastic member (400). In addition, the multifunctional voice coil motor (800) may further include a cover can (500) and a lens barrel (600).

A receptor groove (120 is formed at a rear surface (122) of the magnet (120) opposite to the straight section of the bobbin (110) at the rotor (100), the receptor groove (126) stores the adhesive member (130), which in turn serves to hold the magnet (120) and the housing (210) tightly together.

In the exemplary embodiment of the present disclosure, the adhesive member (130) is stored inside the receptor groove (126), and may be formed on an entire area of a rear surface (122) of the magnet (120). Although the exemplary embodiment of the present disclosure has illustrated and explained only one receptor groove (126) that is formed on the magnet (120), it should be apparent that at least two receptor grooves (126) may be formed on the rear surface of the magnet (120).

Meanwhile, at least one coupling lug (116) is formed at a straight section of the bobbin (110) opposite to the receptor groove (126) formed at the rear surface (122) of the magnet (120), and the coupling lug (116) is formed at a position arranged inside the receptor groove (126).

In the exemplary embodiment of the present disclosure, the coupling lug (116) formed on the straight section of the bobbin (110) is arranged inside the receptor groove (126) formed at the magnet (120), whereby the magnet (120) is prevented from arbitrarily deviating or separating from the bobbin (110) when the rotor (100) performs the auto-focusing and/or handshake correcting functions.

Figure 20:
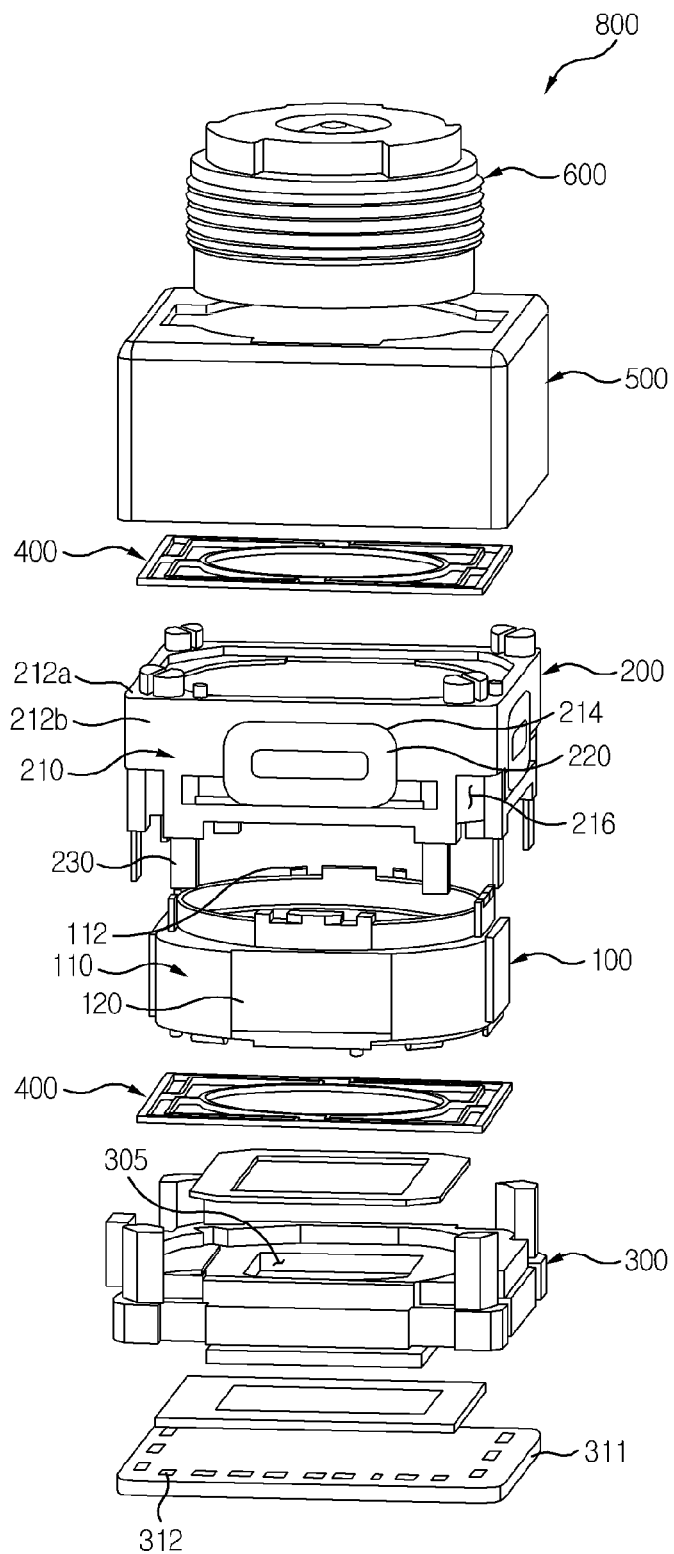
FIG. 20 is an exploded perspective view illustrating a multifunctional voice coil motor according to an exemplary embodiment of the present disclosure.
Figure 21:
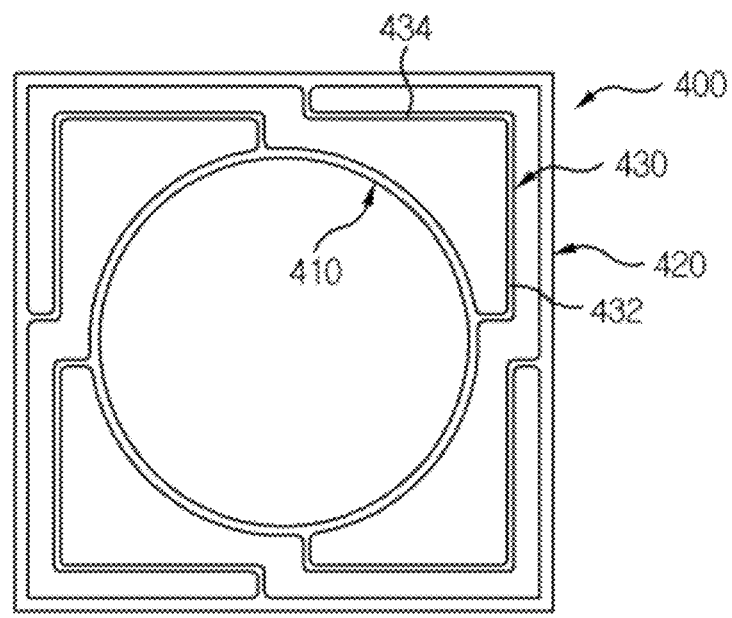
FIG. 21 is a plan view illustrating an elastic member of FIG. 20.

FIG. 20 is an exploded perspective view illustrating a multifunctional voice coil motor according to an exemplary embodiment of the present disclosure, and FIG. 21 is a plan view illustrating an elastic member of FIG. 20.

Referring to FIGS. 20 and 21, the multifunctional voice coil motor (800) simultaneously performing the auto-focusing and hand-shake correcting functions according to an exemplary embodiment of the present disclosure includes a rotor (100), a stator (200), a base (300) and an elastic member (400). In addition, the multifunctional voice coil motor (800) may further include a cover can (500) covering the rotor (100) and the stator (200) and a lens barrel (600).

Although the exemplary embodiment of the present disclosure illustrates that the lens (600) and the rotor (100) are separated, it should be apparent that the lens (600) and the rotor (100) may be integrally formed.

The rotor (100) includes a bobbin (110) and a magnet (120). The rotor (100) vertically (up and down) moves relative to an upper surface of the base (300) by interaction between the stator (200) and the elastic member (400), to be described later, to perform the auto-focusing function, and horizontally (left and right) moves on the upper surface of the base (300) to perform the hand-shake correcting function.

The bobbin (110) may take a cylindrical shape, for example, and may be formed at an inner surface with a female thread coupled to the lens (600). An upper surface of the bobbin (110) and a bottom surface opposite to the upper surface of the bobbin (110) are formed with a coupling lug (112) for being coupled to the elastic member (400, described later).

A periphery of the bobbin (110) takes a shape in which a curved section and a straight section are alternatively formed. The periphery of the bobbin (110) may take a shape in which four curved sections and four straight sections are alternatively formed, for example.

The magnet (120) is coupled to the straight section formed at the periphery of the bobbin (110). In a non-limiting example, the magnet (120) may be arranged at two of each oppositely formed straight section among the four straight sections formed at the periphery of the bobbin (110) or each of the four straight sections. The magnet (120) may include a two-pole flat magnet or a four-pole flat magnet, for example.

In the exemplary embodiment of the present disclosure, in a case the magnet (120) mounted on the periphery of the bobbin (110) vertically and repetitively moves relative to an upper surface of the base (300) to perform the auto-focusing function, and repetitively tilts relative to the base (300) to perform the hand-shake correcting function, the magnet (120) may be separated from the periphery of the bobbin (110). In the exemplary embodiment of the present disclosure, an adhesive may be interposed between the magnet (120) and the bobbin (110) to prevent the magnet (120) from separating from the periphery of the bobbin (110).

Referring to FIG. 20 again, the stator (200) includes a housing (210), a coil block (220) and a terminal plate (230). The housing (210) includes an upper plate (212a) and a lateral plate (212b) extended and/or bent from the upper plate (212a), for example. The upper plate (212a) is formed with an opening exposing the lens (600). In the exemplary embodiment of the present disclosure, the housing (210) may be formed by using a synthetic resin, for example.

The upper plate (212a) of the housing (210) takes a shape of a rectangular plate having an opening, and the lateral plate (212b) is extended along an edge of the upper plate (212a).

The housing (210) may take a shape of a square box opened at upper and bottom surfaces, for example. The housing (210) is arranged therein with the rotor (100), and wraps the magnet (120) arranged at the periphery of the bobbin (110).

The coil block (220) is formed by winding a long wire coated with insulation resin such as enamel resin. In the exemplary embodiment of the present disclosure, the coil block (220) is wound with the wire in a rectangular shape with a thin thickness. One distal end of the coil block (220) and the other distal end opposite to the distal end are formed in mutually opposite direction from the coil block (220).

In a non-limiting example, the distal end of the coil block (220) is arranged at the left side based on a center of the coil block (220), and the other distal end of the coil block (220) is arranged at the right side based on the center of the coil block (220).

The coil block (220) is formed with a predetermined thickness to be wound with the wire. In a case the coil block (220) having with the predetermined thickness is arranged on the lateral surface (212b) of the housing (210), the coil block (220) may be protruded from the lateral surface (212b) to increase the volume of the multifunctional VCM (800).

In the exemplary embodiment of the present disclosure, in order to prevent the multifunctional VCM (800) from having an increased volume caused by the coil block (220), a receptor groove (214) having a depth deep enough to accommodate a part or all of the coil block (220) is formed at an area opposite to the magnet (120) of the rotor (100) on an outer lateral surface of the lateral plate (212b) of the housing (210).

The rotor (100) vertically moves relative to the base (300) to perform the auto-focusing function by applying a driving current to the mutually opposite coil blocks (220) among the coil blocks (220) coupled to the housing (210) of the stator (200) opposite to each magnet (120).

Meanwhile, the rotor (100) tilts relative to the base (300) to perform the hand-shake correcting function by applying a driving current to not oppositely but adjacently formed coil blocks (220) among the coil blocks (220) coupled to the housing (210).

The receptor groove (214) formed at the lateral plate (212b) of the housing (210) is formed in a shape corresponding to that of the coil block (220). Thus, depth of the receptor groove (214) is preferably formed deeper than the thickness of the coil block (220) in order to prevent the coil block (220) from protruding from the outer lateral wail of the lateral plate (212b) at the housing (210).

Although the exemplary embodiment of the present disclosure has illustrated and explained the formation of the groove-shaped receptor groove (214) at the outer lateral wall of the lateral plate (212b) of the housing (210), a through hole accommodating the coil block (220) may be formed at the lateral plate (212b) of the housing (210) corresponding to the magnet (120).

An air gap between the stator (200) and the rotor (100) may be in the range of approximately 0.05 mm to approximately 0.25 mm, preferably approximately 0.15 mm to allow the rotor (100) to tilt relative to the base (300).

Meanwhile, a driving signal is structurally difficult to be applied to the coil block (220), in a case the housing (210) is arranged with coil blocks (220) each corresponding to each magnet (120). Particularly, the driving signal is difficult to be applied to the coil block (220) from a circuit substrate (311) formed at a rear surface of the base (300, described later).

The terminal plate (230) serves to transmit a driving signal provided from the circuit substrate (311) arranged at the rear surface of the base (300) to the coil block (220). The terminal plate (230) is manufactured with a metal plate having a thin thickness, and a part of all that is connected to the coil block (220) among the terminal plate (230) may be formed with a plating layer for improving a connection characteristic with the coil block (220, described later).

At this time, the terminal plate (230) may be arranged in parallel with the lateral wall (212.) of the housing (210). The terminal plate (230) may be integrally formed with the housing (210) by insert injection process. A part of the terminal plate (230) inserted into the housing (210) is exposed by the receptor groove (214) accommodating the coil block (220), and the exposed terminal plate (230) is electrically connected to both distal ends of the coil block (220).

Although the exemplary embodiment of the present disclosure has illustrated and explained the terminal plate (230) inserted into the housing (210), it should be apparent that alternatively, the terminal plate (230) may be inserted into and secured at an insertion groove formed at the housing (210).

Referring to FIG. 1, the terminal plate (230) is protruded from a bottom surface of the housing (210) at a predetermined length so as to be electrically connected to the circuit substrate (311) by passing the base (300, described later). At this time, the terminal plate (230) protruded for the bottom surface of the base (300) may be arranged to a direction parallel with the lateral wall (212) of the housing (210). Alternatively, the terminal plate (230) protruded for the bottom surface of the base (300) may be bent to a direction parallel with the bottom surface of the base (300).

The base (300) takes a shape of a parallelepiped, for example. The base (300) is centrally formed with an opening (305), and a coupling pillar (310) is protruded from the base (300) for coupling with the housing (200). The coupling pillar (310) of the base (300) and the coupling groove (216) formed at the housing (200) opposite to the coupling pillar (310) are coupled by way of press-fitting method. The base (300) may be mounted at a rear surface with an IR (Infrared) filter and an image sensor module.

The base (300) is electrically connected to the coil block (220), and formed with a receptor unit (320) accommodating the terminal plate (230) protruded from the bottom surface of the housing (210), and the terminal plate (230) protruded from the bottom surface of the housing (210) passes the receptor unit (320).

Referring to FIGS. 20 and 21, the elastic member (400) elastically supports the rotor (100). The elastic member (400) restores the rotor (100) moved upwardly relative to the base (300) to an initial position to realize the auto-focusing function, or restores the rotor (100) tilted to the base (300) to an initial position to realize the hand-shake correcting function.

In the exemplary embodiment of the present disclosure, the elastic member (400) elastically supporting the bobbin (110) of the rotor (100) has a great influence to the auto-focusing function and the hand-shake correcting function, A tilting characteristic of the rotor (100) is greatly changed depending on the shape of the elastic member (400) when the hand-shake correcting function is performed. The rotor (100) in the present disclosure is so formed as to prevent the elastic members (400) from being mutually interfered when the rotor (100) performs the tilting operation on the base (300).

The elastic member (400) includes a first frame unit (410), a second frame unit (420) and an elastic unit (430).

The first frame unit (410) is arranged at a distal end of the bobbin (110) of the rotor (100), and formed along the distal end of the bobbin (110). In the exemplary embodiment of the present disclosure, the first frame unit (410) takes a shape of a round ring when viewed from a plane in a case the bobbin (110) takes a shape of a cylinder. The first frame unit (410)

may be coupled to the coupling lug (112) formed at the distal end of the bobbin (110) of the rotor (100).

The second frame unit (420) may be arranged at a distal end of the lateral plate (212b) of the housing (210). The second frame unit (420) may take a shape of a square ring along the distal end of the lateral plate (212b) of the housing (210).

The elastic unit (430) generates elasticity for elastically supporting the bobbin (110) of the rotor (100). A distal end of the elastic unit (430) is integrally formed with the first frame unit (410), and the other distal end of the elastic unit (430) is integrally formed with the second frame unit (420). A plurality of elastic units (430), e.g., four elastic units each symmetrically formed, may be formed based on a center of the first frame unit (410) or based on a center of the second frame unit (420), and each of the plurality of elastic units (430) may be formed at an equal gap.

In the exemplary embodiment of the present disclosure, the elastic unit (430) may be formed in a shape parallel with a neighboring side of the second frame unit (420), and in a case the second frame unit (420) is formed in a shape of a square ring in the exemplary embodiment of the present disclosure, the elastic unit (430) may be formed in an "L" shape when viewed from a plane. In the exemplary embodiment of the present disclosure, in a case the elastic unit (430) is formed at a corner area of the second frame unit (420), there may be interference with adjacent elastic unit (430) when elasticity is applied to each elastic unit (430).

Referring to FIG. 21, the elastic unit (430) includes a first elastic unit (432) and a second elastic unit (434). The first elastic unit (432) is connected, not to a corner of the first frame unit (410), but to a center of the first frame unit (410), and the second elastic unit (434) is connected, not to a corner of the second frame unit (420), but to a center of the second frame unit (420). Alternatively, it should be apparent that the first and second elastic units (432, 434) may be connected to the centers of the first and second frame units (410, 420).

In the exemplary embodiment of the present disclosure, the first elastic unit (432) connected to the center of the first frame unit (410), and the second elastic unit (434) connected to the center of the second frame unit (420) may be respectively formed in a shape of a straight bar.

In the exemplary embodiment of the present disclosure, in a case the elastic unit (430) including the first and second elastic units (432, 434) is connected to the centers of the first and second frame units (410, 420), the interference by driving of neighboring elastic unit (430) can be prevented or restricted, whereby performance reduction of hand-shake correcting function by interference of each elastic unit (430) of the elastic member (400) can be prevented when the rotor (100) is tilted on the base (300) for performing the hand shake correcting function.

Figure 22:
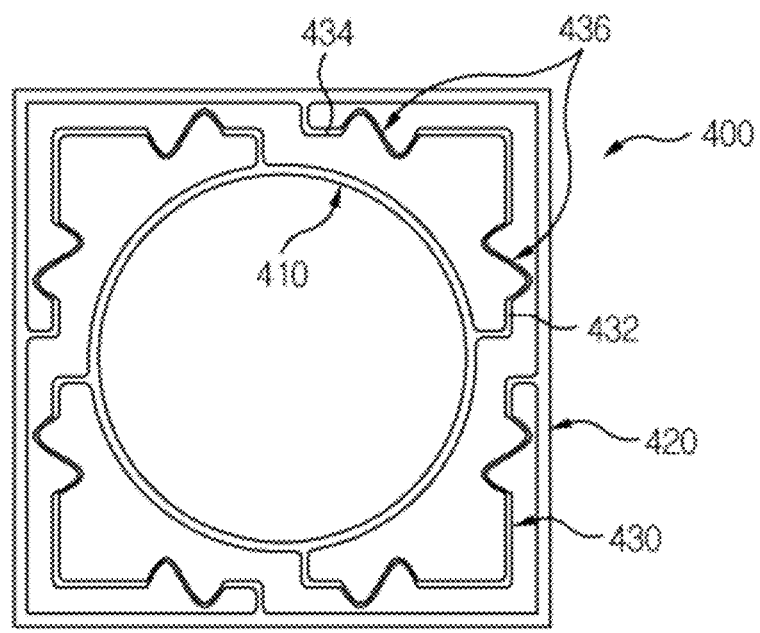
FIG. 22 is a plan view illustrating a changed elastic member of FIG. 21 according to an exemplary embodiment of the present disclosure.

FIG. 22 is a plan view illustrating a changed elastic member of FIG. 21 according to an exemplary embodiment of the present disclosure.

Referring to FIG. 22, the elastic member (400) includes a first frame unit (410), a second frame unit (420) and an elastic unit (430). The elastic unit (430) includes a first elastic unit (432), a second elastic unit (434) and a third elastic unit (436).

The first elastic unit (432) is connected to a center of the first frame unit (410), the second elastic unit (434) is connected to a center of the second frame unit (420), and the third elastic unit is connected to the first and second elastic units (432, 434) respectively. The third elastic unit (436) may be at least partially formed in the shape of a curve, for example, an "S" shape when viewed from a plane, in order to adjust elastic modulus and to improve elasticity.

Although the exemplary embodiment of the present disclosure has illustrated and explained that each one third elastic unit (436) is formed on the first and second elastic units (432, 434), it should be apparent that alternatively, east two third elastic units may be formed on the first and second elastic units (432, 434).

Figure 23:
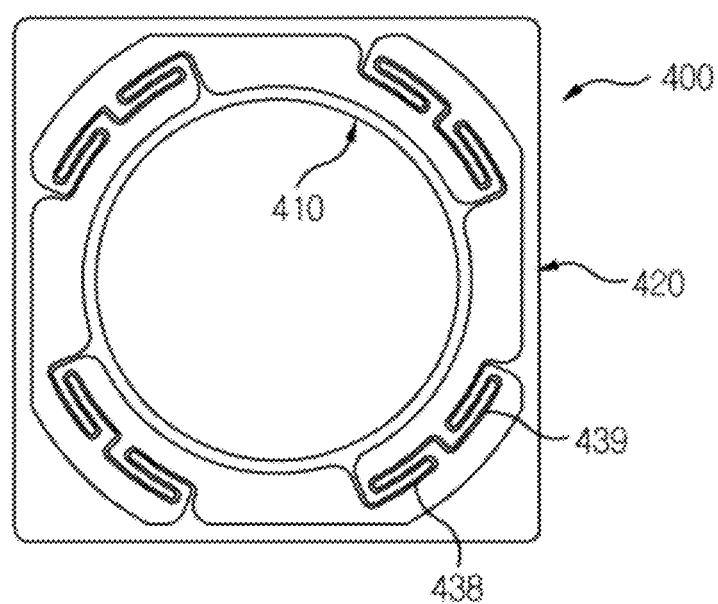
FIG. 23 is a plan view illustrating a changed elastic member of FIG. 21 according to another exemplary embodiment of the present disclosure.

FIG. 23 is a plan view illustrating a changed elastic member of FIG. 21 according to another exemplary embodiment of the present disclosure.

Referring to FIG. 23, the elastic member (400) includes a first frame unit (410), a second frame unit (420) and an elastic unit (430). The elastic unit (430) includes a first elastic unit (438) and a second elastic unit (439).

The first elastic unit (438) takes a curved shape of "S", and is connected to a center of the first frame unit (410). The second elastic unit (439) takes a curved shape of "S", and is connected to a center of the second frame unit (420). Another distal end of the first elastic unit (438) and another distal end of the second elastic unit (439) are mutually connected.

As apparent from the foregoing, the multifunctional voice coil motor according to the present disclosure has an industrial adaptability in that the hand shake correction mode, the auto-focusing mode, and the hand shake correction mode and the auto-focusing mode can be simultaneously performed.

Furthermore, the multifunctional voice coil motor according to the present disclosure has another industrial adaptability in that a lens barrel-mounted rotor is tilted to perform the hand shake correction function, by arranging a plurality of magnets on a bobbin of the lens barrel-mounted rotor, arranging coil blocks facing each magnet on a magnet-wrapping housing, selectively applying a driving signal to the coil blocks to adjust a gap between the lens barrel mounted at the rotor and an image sensor module arranged at a rear surface of a base, and performing the auto-focusing function and selectively applying the driving signal to the coil blocks, and a terminal plate coupled to the coil block can be easily and precisely connected to a connection terminal of a circuit substrate.

The multifunctional voice coil motor according to the present disclosure has still another industrial adaptability in that, in addition to simultaneous performance of the hand shake correction mode, the auto-focusing mode, and the hand shake correction mode and the auto-focusing mode, the magnet can be prevented from arbitrarily deviating from the bobbin when the hand shake correction mode and the auto-focusing mode are performed.

The multifunctional voice coil motor according to the present disclosure has still further industrial adaptability in that an elastic member generating elasticity is arranged on the bobbin of barrel-mounted rotor and the housing, whereby the hand shake correction performance can be further improved by accurately tilting the bobbin when the bobbin is tilted for hand shake correction.

The above-mentioned multifunctional voice coil motor according to the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. A multifunctional voice coil motor, comprising:
a rotor including a bobbin and at least one magnet disposed on a side surface of the bobbin;
a stator including a housing, at least one coil block disposed on a side surface of the housing, and a plurality of terminals, wherein the terminals are connected to the coil block;
a base coupled to the housing, wherein a groove is concavely formed from a side surface of the base through which the terminals pass; and
an elastic member configured to support the rotor,
wherein a position of the least one coil block corresponds to that of the at least one magnet;
wherein the stator includes a terminal plate connected to each terminal of each coil block, and the base is formed with a receptor accommodating the terminal plate;
wherein the receptor is formed in a shape of a groove through which each terminal plate passes, and formed with a guide unit guiding the terminal plate; and
wherein the guide unit includes a guide rib being protruded from an inner surface of the receptor and guiding each lateral surface of the terminal plate.

2. The multifunctional voice coil motor of claim 1, wherein a distal end of a terminal is protruded from a rear surface of the base.

3. The multifunctional voice coil motor of claim 2, wherein the distal end of each terminal protruded from the rear surface of the base is bent in parallel with the rear surface of the base.

4. The multifunctional voice coil motor of claim 2, further comprising a circuit substrate disposed below the base, and the circuit substrate has a connection unit electrically connected to the distal end of each terminal protruded from the rear surface of the base.

5. The multifunctional voice coil motor of claim 4, wherein the distal end of each terminal connected to the connection unit is electrically connected to the connection unit by any one of solder and conductive adhesive.

6. The multifunctional voice coil motor of claim 4, wherein the connection unit is formed with an insertion hole into which the distal end of the terminal is inserted.

7. The multifunctional voice coil motor of claim 1, wherein the base is protruded at an upper corner with a coupling pillar, and the housing is formed with a coupling groove coupled with the coupling pillar.

8. The multifunctional voice coil motor of claim 1, wherein the terminals and the ends of each coil block are respectively electrically connected via a connection member.

9. The multifunctional voice coil motor of claim 8, wherein the connection member includes a solder.

10. The multifunctional voice coil motor of claim 8, wherein the connection member includes a conductive adhesive.

11. The multifunctional voice coil motor of claim 8, wherein a coil block groove is formed on the side surface of the housing which receives the coil block.

12. The multifunctional voice coil motor of claim 11, wherein a part of each terminal contacting the coil block is exposed by the coil block groove.

13. The multifunctional voice coil motor of claim 12, wherein a plating layer is further formed in the part of each terminal contacting the coil block.

14. The multifunctional voice coil motor of claim 1, wherein an adhesive member is interposed between the bobbin and the magnet.

15. The multifunctional voice coil motor of claim 14, wherein the adhesive member includes an adhesive.

16. The multifunctional voice coil motor of claim 1, wherein the elastic member includes a first frame unit coupled to the distal end of the bobbin, a second frame unit coupled to a distal end of the housing and an elastic unit connected to a central unit of the first frame unit and connected to a central unit of the second frame unit.

17. The multifunctional voice coil motor of claim 16, wherein the first frame unit takes a shape of circular ring and the second frame unit takes a shape of a square ring.

18. The multifunctional voice coil motor of claim 16, wherein the elastic unit has two sides parallel to the adjacent second frame unit.

19. The multifunctional voice coil motor of claim 18, wherein the elastic unit takes an "L" shape when viewed from a plane.

20. The multifunctional voice coil motor of claim 16, wherein two elastic units are symmetrically formed based on a center of the first frame unit.

* * * * *